April 27, 1971 G. L. FILIP 3,576,669

METHOD FOR COATING THROUGH-HOLES

Filed Aug. 15, 1968

INVENTOR
GEORGE L. FILIP

BY Alfred Coy
Charles C. Wells
ATTORNEYS

United States Patent Office 3,576,669
Patented Apr. 27, 1971

3,576,669

METHOD FOR COATING THROUGH-HOLES

George L. Filip, Madison, Ala., assignor to the United States of America as represented by the Administrator of the National Aeronautics and Space Administration Filed Aug. 15, 1968, Ser. No. 752,946
Int. Cl. H05k *3/00;* B44d *1/18*
U.S. Cl. 117—212 2 Claims

ABSTRACT OF THE DISCLOSURE

Through-holes in a ceramic substrate are given a conductive coating of a liquid metal mixture by immersing a plurality of spaced rods in a coating material; withdrawing the rods with globules of the mixture clinging to the rods; passing the rods through like spaced holes in a substrate and back into the coating material so to deposit the coating material on one side of the substrate. The rods are then withdrawn from the coating material with clinging globules of coating materials and the other side of the substrate is coated as the pins pass through the through-holes in the substrate.

BACKGROUND OF THE INVENTION

The invention described herein was made by an employee of the United States Government and may be manufactured and used by or for the Government for governmental purposes without the payment of any royalties thereon or therefor.

The invention relates in general to the art of applying a metal-containing liquid to a surface so as to form electrically conductive coatings thereon. More particularly, the invention is a method for coating the surfaces and area around through-holes in ceramic substrates to be used in the fabrication of miniaturized electronic circuits.

Small thin wafers of ceramic or other materials are employed as a substrate or supporting base for small electrical circuits which are printed on the wafer. In many instances the wafer will have circuitry printed on both sides of the wafer and it is necessary to electrically connect these two circuits. This is normally accomplished by drilling holes in the wafer through which electrical connections can be made. A common way of making such connections is to coat the area around the through-hole, as well as the vertical surfaces thereof, with a liquid having an electrically conductive metal such as gold, silver, platinum, etc., suspended or dissolved therein. Such coatings are first applied, permitted to dry, and then "fired on" by placing in an oven heated to a desired firing temperature.

Heretofore the liquid coating has been first applied to the through-hole in the substrate by hand painting with a small brush. This required that each hole be done individually. There resulted a very time consuming operation which yielded unsatisfactory results.

SUMMARY OF THE INVENTION

The present invention provides a method and apparatus for applying conductive coatings to substrate through-holes that achieves uniform results and greatly reduces coating time. This is accomplished by first immersing a plurality of spaced pins in a tank of coating material. The pins are attached at one end to a plate mounted on an apparatus so that the pins can be lowered into and raised from a tank of coating material. The tank is mounted on a part of the apparatus. Coating material clings to the pins and when the pins are passed through a substrate having like spaced holes the coating material is deposited on the substrate around and in the through-holes. The apparatus is provided with a moveable substrate holder that permits positioning of the substrate between the pins and the tank of coating material. The substrate can be moved to a position such that when the pins with globules of coating material already on them are passed through the substrate the pins extend into the tank of coating material. Globules of coating material cling to the pins when they are again withdrawn from the coating material and these globules are deposited on the underside of the substrate around each through-hole and in the vertical surface of the through-hole as well. This completes the through-hole coating operation for each substrate and it is readily apparent that uniform results, speed, and reduced handling of the substrate is possible.

DESCRIPTION OF THE PREFERRED EMBODIMENT

Figure 1:
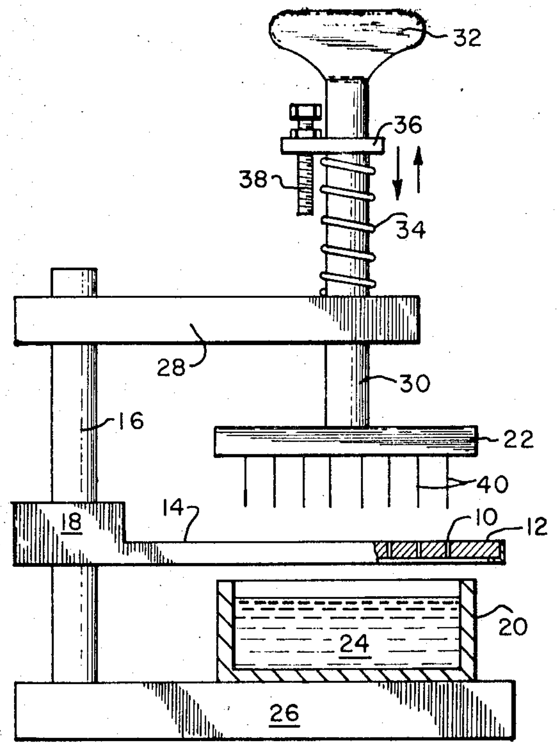
FIG. 1 is a view, partially in section, of the apparatus employed in the coating operation.

FIG. 1 discloses apparatus for coating through-holes 10 in a typical ceramic substrate 12 with a liquid coating material commonly termed a firing ink. Firing inks are liquids having a metal suspended or dissolved therein which are "fired on" a component or circuit board to provide electrical connections thereto or conductive paths thereon. The metal component of a firing ink can be silver, gold, platinum or some combination thereof. Numerous firing inks are commercially available.

The substrate is mounted in a holder 14 pivotally mounted to post 16. Pivotal connection 18 permits movement of the substrate to or away from a position between tank 20 and plate 22. Tank 20 contains coating material 24 and the tank is mounted on base 26 which forms a pedestal that supports post 16 and a beam 28 fixed to the upper end of post 16. A plunger 30 is slidably mounted in beam 28 and has a plate 22 mounted on one end thereof. A knob 32 is mounted on the other end. A spring 34 encircles the plunger and abuts beam 28. A collar 36 is fastened to the plunger so as to bias the plunger in an upwardly direction. Collar 36 has an adjustable stop 38 mounted thereon which limits the downward movement of plunger 30. Plate 22 mounted on one end of plunger 30 has a plurality of spaced pins 40 attached so as to extend downwardly toward the coating material in tank 20. The pin diameter is slightly less than that of holes 10 in the substrate. The spacing of the pins is such that the pins will pass through the holes in the substrate when the pins are lowered by pushing downward on knob 32.

Figure 2:
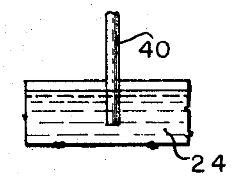
FIGS. 2 through 6 are sequential illustrations of pin position relative to the substrate and tank of coating material throughout the coating operation.
Figure 3:
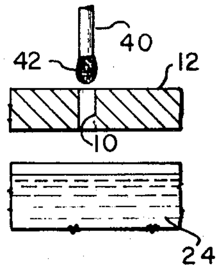
Figure 4:
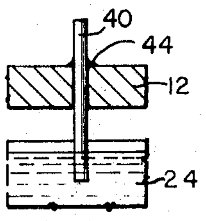
Figure 5:
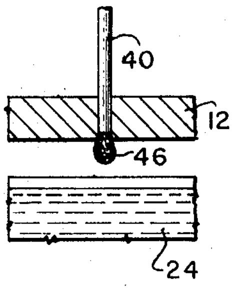
Figure 6:
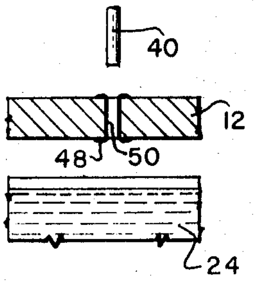

The operation of the apparatus shown in FIG. 1 and the steps involved in the coating operation will be described with reference to FIGS. 2 through 6. While only one pin is shown in these figures for ease of illustration, it should be understood that the ends of all the pins would be immersed in actual practice. The operation begins by rotating the substrate holder and substrate away from its position between the pins and tank of coating material. Knob 32 is then pushed down to lower plunger 30 and immerse the pins in the coating material as shown in FIG. 2. Plunger 30 is then permitted to gently return to its up position so as to withdraw pins 40 from the coating material. Globules 42 of coating material cling to each of the pins 40 as they are withdrawn, see FIG. 3. The substrate is rotated back to its position between the pins and the tank and the plunger and pins are lowered to the position shown in FIG. 4. In passing through the through-hole in the substrate, globule 42 of coating material is deposited on the upper surface of the substrate as indicated at 44 in FIG. 4. Also, some of the coating material is deposited on the vertical surface of the through-hole. As shown in FIG. 4, the end of the rod extends into the coating material after passing through the substrate so that when the pin is raised back through the substrate (FIGS. 5 and 6) coating material 46 clinging to the pin will be deposited on the underside of the substrate, as indicated at 48, and on the vertical surface of the hole. When the sequence illustrated has been completed the upper and lower surfaces of the substrate around a through-hole are coated and a coating indicated by the numeral 50 has been deposited on the entire vertical or internal surface of the hole so as to provide an electrical connection between the two sides of the substrate.

What is claimed is:

1. The method of applying an electrically conductive coating to through-holes in a substrate to be utilized in fabricating micro electronic circuits, said method comprising the steps of:

immersing a plurality of spaced pins into a tank containing a mixture of coating material;

withdrawing the pins from the mixture along with globules of coating material clinging to the pins;

passing said pins through like spaced holes in a horizontally disposed ceramic substrate and back into the coating material so that the ends of said pins are again immersed in said coating material, whereby globules of coating material clinging to said pins from the first immersion form circular deposits of coating material around the holes in the top of the substrate and on the vertical surfaces of the holes;

withdrawing said pins from said coating material and out of the holes in said substrate; whereby globules of coating material clinging to said pins will form deposits on the underside of the substrate around the holes formed therein and on the vertical surfaces of the holes.

2. The method recited in claim 1 wherein said spaced pins are supported in a fixed position over the tank of coating material with only a controlled amount of vertical movement possible, and the substrate is moved into a position between the pins and tank when the pins are to be passed through the through-holes and away from this position when the pins are to be immersed without first passing through the through-holes in the substrate.

References Cited

UNITED STATES PATENTS

| | | | |
|---|---|---|---|
| 3,335,700 | 8/1967 | Di Grado et al. ------ | 118—263 |
| 3,034,478 | 5/1962 | Schwartz --------- | 118—200X |
| 2,757,110 | 7/1956 | Kalback --------- | 118—200X |

ALFRED L. LEAVITT, Primary Examiner

A. GRIMALDI, Assistant Examiner

U.S. Cl. X.R.

117—95, 98